US008517424B2

(12) United States Patent
Brents

(10) Patent No.: US 8,517,424 B2
(45) Date of Patent: Aug. 27, 2013

(54) COMFORTABLE SEAT BELT EXTENDER THAT IS EASY TO INSTALL AND USE

(76) Inventor: Brian Matthew Brents, Crane, TX (US)

( * ) Notice: Subject to any disclaimer, the term of this patent is extended or adjusted under 35 U.S.C. 154(b) by 222 days.

(21) Appl. No.: 12/939,410

(22) Filed: Nov. 4, 2010

(65) Prior Publication Data

US 2011/0101765 A1    May 5, 2011

Related U.S. Application Data

(60) Provisional application No. 61/257,961, filed on Nov. 4, 2009.

(51) Int. Cl.
B60R 22/22    (2006.01)
(52) U.S. Cl.
USPC ................ 280/801.1; 297/468; 297/463.2
(58) Field of Classification Search
USPC ......... 297/468, 482, 463.1, 463.2; 280/801.1
See application file for complete search history.

(56) References Cited

U.S. PATENT DOCUMENTS

| | | | | |
|---|---|---|---|---|
| 4,157,841 A | * | 6/1979 | Bergman et al. | 297/482 |
| 4,569,190 A | * | 2/1986 | Gilmore | 297/468 |
| 4,673,217 A | * | 6/1987 | Nishiyama et al. | 297/473 |
| 4,676,556 A | * | 6/1987 | Yamanoi et al. | 297/468 |
| D352,591 S | * | 11/1994 | Laney | D2/631 |
| 6,969,122 B2 | * | 11/2005 | Sachs et al. | 297/468 |
| 7,648,171 B2 | * | 1/2010 | Marriott et al. | 280/801.1 |
| 7,922,205 B2 | * | 4/2011 | David et al. | 280/801.1 |

* cited by examiner

Primary Examiner — Peter Brown
(74) Attorney, Agent, or Firm — Oakwood Law Group, LLP; Yuchien Wei

(57) ABSTRACT

A seat belt extender having a rigid non-flexible elongated flat strap with a male connector attached to a first end of the rigid non-flexible elongated flat strap for removably engaging a female connector attached to the floor of an automobile of a three point seat belt and shoulder strap restraint system, and a female connector attached to a second end of the rigid non-flexible elongated flat strap for removably engaging a male connector of the three point seat belt and shoulder strap restraint system. The rigid non-flexible elongated flat strip will stand upright when removably attached to the female connector and has a length that is between two and sixteen inches. The rigid elongated flat strip also has a bend that will locates the female connector of the seat belt extender sideways out away from the side of the seat by a distance of between one inch and four inches when removably attached to the female connector.

12 Claims, 1 Drawing Sheet

COMFORTABLE SEAT BELT EXTENDER THAT IS EASY TO INSTALL AND USE

REFERENCE TO RELATED APPLICATIONS

This patent application claims the benefit of U.S. Provisional Application No. 61/257,961 filed on Nov. 4, 2009, the disclosure of which is incorporated herein by reference in its entirety.

BACKGROUND OF THE INVENTION

1. Field of the Invention

The present invention relates generally to a seat belt apparatus, and more particularly to a new and improved seat belt extension which provides an elongate length of seat belt adapted to be mounted to an existing seat belt structure.

The seat belt extender disclose extends the three point seat belt and shoulder strap restraint system upward to provide additional space for the user. The seat belt extender is formed of a relatively short length of rigid, non-flexible material which is shaped to be located out away from a person's side and mid-section to accommodate a large or heavy person by providing a more comfort space at the person's mid-section when the three point seat and shoulder strap of an automobile is located across the person.

Accordingly, there is a need for a seat belt extender which can be removably attached to the female receptacle at the free end of the conventional short seat belt and shoulder strap anchor, and which provides for the attachment of the male latch member extending from the longer seat belt and shoulder strap assembly. The present seat belt extender disclosed has a strip of rigid non-flexible material having a male latch member on one end and a female receptacle on the opposite end. The rigid non-flexible body of the extender has a shape which locates an end that attaches to a three point seat belt and shoulder strap out away from an individual's mid-section to provide more comfort space in the mid-section of a large or heavy person. The shape of the seat belt extender may be a concave of V shaped indentation or bend at or near the midpoint. In another embodiment the bend in the extender may have a rounded curve shape or two indentions approximately spaced evenly between the male latch member located at one end and the female receptacle on the other end.

2. Description of Related Art

Seat belts which can be extended to accommodate individuals, including large or heavy individuals or to hold an article in a seat of a moving vehicle are known in the prior art. More specifically, by way of example U.S. Pat. No. 6,969,122 to Sachs, et al. discloses a semi-rigid seat belt extender which remains generally upright when secured to the anchor strap to enable a person having limited upper body mobility to easily access the receptacle end of the extender with the tongue of the existing belt and shoulder strap assembly.

U.S. Pat. No. 6,520,392 to Thibodeau, et al. discloses a backup buckle that is mounted to a vehicle seat belt for offering an alternate release point along the seat belt in vehicles having hard-to-reach seat belt buckles.

U.S. Pat. No. 6,343,841 to Gregg, et al. discloses a seat belt extension for extending a seat belt while preventing twisting of the seat belt.

U.S. Pat. No. 6,312,015 to Merrick, et al. discloses a clamp for relieving the tension in a seatbelt. The clamp is moveable along a track between first and second end stops and includes a movable button which can be pushed to lock the clamp to the seat belt. The clamp can be secured to the seat belt at a first end stop. Subsequent movement by the passenger results in the clamp moving along the track. Upon reseating by the passenger, the clamp will be supported at a support position intermediate of the first and second end stops to provide increased slack in the shoulder portion of the seat belt.

U.S. Pat. No. 5,570,933 to Rouhana, et al. discloses a seat belt extender that includes a shoulder belt and an extender lap belt. The extender shoulder belt has an upper extender end adjustably coupled to the shoulder belt. The extender lap belt has a first lap extender end connected to the lap-shoulder belt junction and a second lap extender end connected to a lower extender end of the extender shoulder belt to form an extender junction which is releasably connected to the vehicle at the normal location of the lap-shoulder belt junction.

U.S. Pat. No. 5,248,187 to Harrison discloses a seat belt extension apparatus which includes a central web with a rear buckle plate and forward buckle assembly which can be secured to an existing seat belt structure.

U.S. Pat. No. 5,215,333 to Knight discloses a seat belt adjustment band which is connected the shoulder belt and to the lap belt to change the location of the shoulder belt to keep the shoulder belt from rubbing against the face or neck of the wearer.

U.S. Pat. No. 5,042,838 to Carter discloses an attachment for enabling the shoulder belt portion of a restraining device to be adjusted for the comfort of the wearer. The attachment slidably engages the lap belt portion of the restraint device by clamping elements associated with the rear face. An elongated hook member disposed on the front face slidably engages the shoulder belt.

U.S. Pat. No. 4,832,367 to Lisenby discloses an auxiliary strap which extends vertically between and interconnects the lap belt and a medial portion of the shoulder belt to deflect the shoulder belt downwardly and away from the neck of the passenger.

SUMMARY OF THE INVENTION

In an exemplary embodiment of the present invention, there is disclosed a seat belt extender having a rigid non-flexible elongated flat strap with a male connector attached to a first end of the rigid non-flexible elongated flat strap for removably engaging a female connector attached to the floor of an automobile of a three point seat belt and shoulder strap system, and a female connector attached to a second end of the rigid non-flexible elongated flat strap for removably engaging a male connector of the three point seat belt and shoulder strap system. The rigid non-flexible elongated flat strip will stand upright when removably attached to the female connector and has a length that is between two and sixteen inches. The rigid elongated flat strip also has a bend that will locates the female connector of the seat belt extender sideways out away from the side of the seat by a distance of between one inch and four inches when removably attached to the female connector.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Present day seat belt extenders are difficult to install and/or use. Some large and/or heavy individuals do not use a seat belt because the extender that they have is too difficult to install and/or use. Other large and/or heavy individuals find seat belt extenders to be uncomfortable and, therefore, resist using a seat belt. Not using a seat belt places large and/or heavy individuals at a higher risk for injury or death in the event of an accident.

Some non-rigid seat belt extenders require making an extra adjustment after both ends of the extender are fastened to the three point seat belt and shoulder harness. Extenders that have a bendable Nylon web extender member can result in the user's garments being snagged. Many seat belt extenders require tools to install. Slightly bendable seat belt extenders do not provide any significant extra space for comfort. The seat belt extender here disclosed requires no tools for use and is shaped to extend above and curve away from the mid-section of a user's body to provide a more comfort space for a large and/or heavy person.

Figure 1:
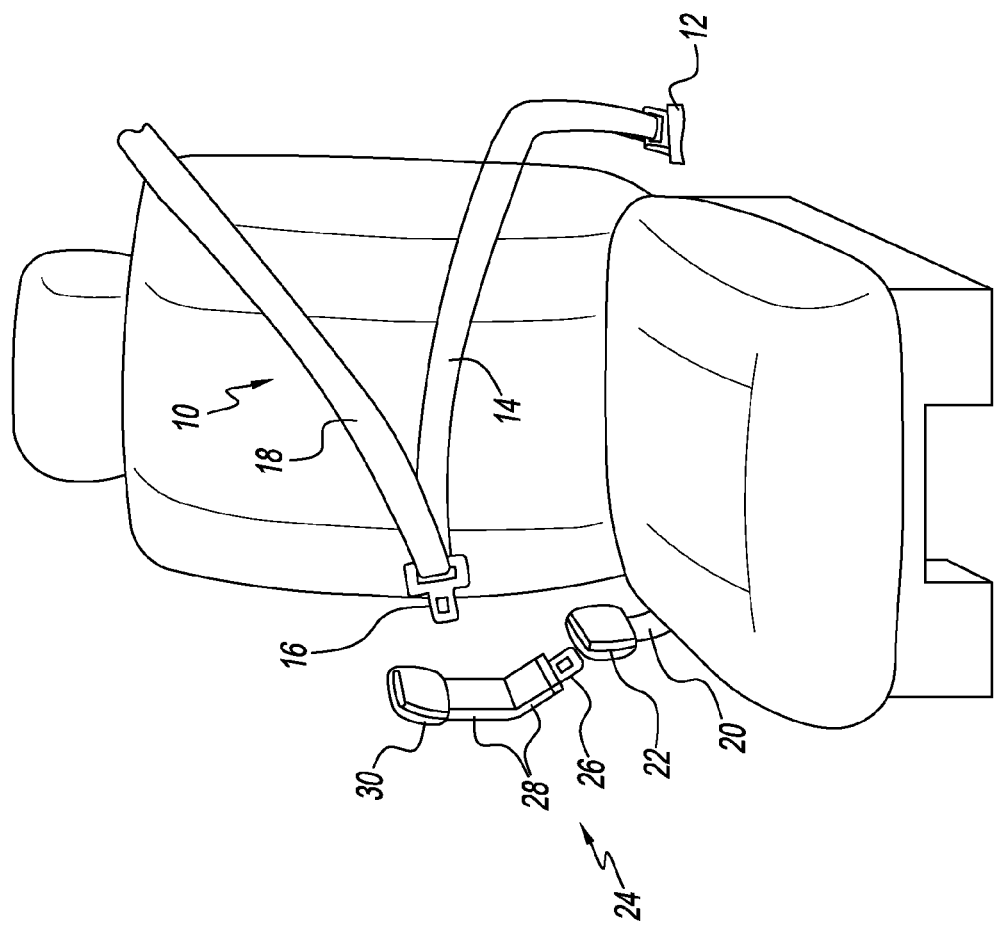
FIG. 1 is a perspective view of an automobile seat with a three point seat belt and shoulder strap and a seat belt extender in accordance with the principles of the invention.

Referring to FIG. 1, there is shown a perspective view of an automobile seat with a seat belt extender which can be used with a standard automobile three point seat belt and shoulder strap.

The three point seat belt and shoulder strap has a relatively long single belt 10 which extends from an anchor connection normally anchored to the floor of an automobile, across the lap of a seated person to form a seat belt 14, slidably connected through a male latch member 16 to a location which is above and behind a users shoulder to provide a shoulder strap 18. The shoulder strap extends through a loop generally anchored to a side post of the automobile and is attached to a take up reel. A short length of webbing 20 which is attached at one end to the floor of the automobile along the side of the seat near the center of the automobile has at its other end a female receptacle 22 which is designed to receive the male latch member 16. The short length of webbing 20 is relatively stiff and the female receptacle 22 has very limited motion and normally is located vertically near the top of the seat of the automobile. The relatively short length of the relatively stiff webbing 20 and the location of the female connector 22 limits the amount of space that is provided when the seat belt and shoulder strap are being used.

The seat belt anchor extension 24 of the present invention increases the amount of space that is available for use by a user by moving the attachment point for the male latch member 16 further up and out away from the side of the user toward the center of the automobile.

Figure 2:
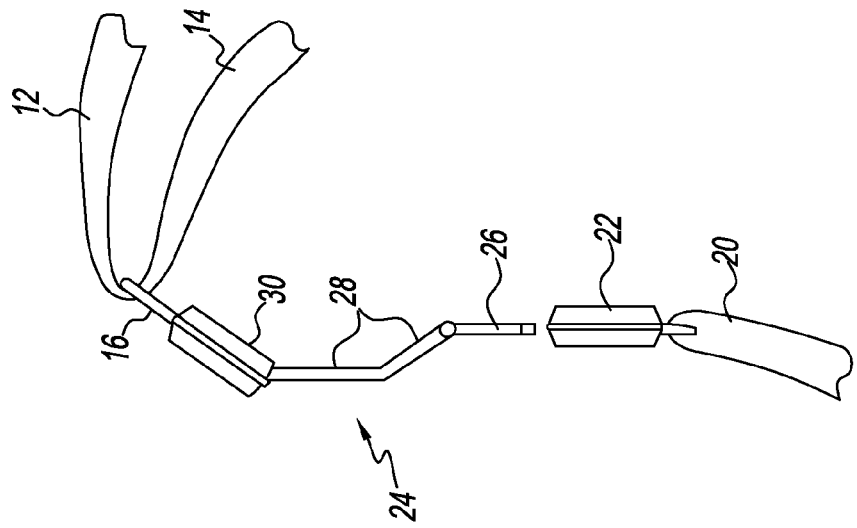
FIG. 2 is an exploded side view of the seat belt extender invention located between the male latch member and female receptacle of the three point seat belt and shoulder strap of an automobile seat.

Referring to FIG. 2, there is shown an exploded side view of the seat belt extender invention located between the male latch member and female receptacle of a three point seat belt and shoulder strap of an automobile restraint system. The seat belt extender 24 is comprised of the following:

Seat Belt Extender male connector, 26 which is adapted to engage the female connector 22 that is a part of the three point seat belt and shoulder strap restraint system.

Seat Belt Extender mid-section comfort area, 28.

Seat Belt Extender female connector, 30 which is adapted to engage the male latch member 16 that is a part of the three point seat belt and shoulder strap restraint system.

The seat belt extender mid-section comfort area 28 is a flat strap made of a woven webbing or non-woven material which resembles in color and texture the material of the three point seat belt and shoulder strap normally used in an automobile. The webbing or material of the seat belt extender is located around a rigid, non-flexible member made of aluminum, steel, plastic, etc. which is attached at one end to the seat belt extender male connector 26 and at the other end to the seat belt extender female connector 30. The seat belt extender 24 may have an overall length of between two and sixteen inches where a preferred overall length of the seat belt extender is about eight inches more or less. In addition, the seat belt extender 24 has a bend or curve which locates the female connector 30 of the seat belt extender sideways out away from the side of the seat by a distance of between one inch and four inches where a sideway displacement of two inches is preferred.

In use, with a large and/or heavy person sitting in the seat of an automobile which is equipped with a standard three point seat belt and shoulder strap, the seat belt extender male connector 26 is removably attached to the female connector 22 of the three point restraint system with a ⅞ inch or a 1 and $\frac{1}{10}^{th}$ inch wide clip.

The seat belt extender female connector 30, that can accept the male latch member 16 with a ⅞ inch or a 1 and $\frac{1}{10}^{th}$ inch wide clip, is extended upward which allows the male latch member 16 to be fastened quickly and easily with one hand or with slight assistance from the opposite hand for alignment to be fastened together.

With a large and/or heavy person sitting in the seat of an automobile which is equipped with a standard three point restraint system, the seat belt extender male connector 26 is removably attached to the female connector 22 of the three point restraint system with a ⅞ inch or a 1 and $\frac{1}{10}^{th}$ inch wide clip.

The seat belt extender female connector 30, that can accept the male latch member of a three point restraint system with a ⅞ inch or a 1 and ¹⁄₁₀ᵗʰ inch wide clip, is extended upward which allows the male latch member 16 to be fastened quickly and easily with one hand or with slight assistance from the opposite hand for alignment to be fastened together.

The rigid mid-section comfort area 28 of the seat belt extender 24 mid-section comfort area 28 is shaped to have a rounded curve or a concave indentation at or near the midpoint. In another embodiment the rigid mid-section can have two indentions or bends which may be spaced evenly between the seat belt extender male connector 26 and the seat belt extender female connector 30.

With a large and/or heavy individual sitting in the seat of an automobile which is equipped with a standard three point seat belt and shoulder strap restraint system, the seat belt extender male connector 26 would be removably attached to the female connector 22 with a ⅞ inch or a 1 and ¹⁄₁₀ᵗʰ inch wide clip.

The seat belt extender female connector 30, that can accept a male connector 16 with a ⅞ inch or a 1 and ¹⁄₁₀ᵗʰ inch wide clip, extends upward the male latch member 16 which allows it to be fastened quickly and easily with one hand or with slight assistance from the opposite hand for alignment to be fastened together.

The seat belt extender here disclosed can also be used for other seated position activities which do not involve an automobile or a traditional vehicle where seat belts are used. The seat belt extender can be used for, but is not limited to amusement rides. The rigid mid-section comfort area of the seat belt extender is shaped to curve away from the mid-section of a person's body to provide more comfort space for a large and/or heavy individual.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A seat belt extender comprising:
    a rigid non-flexible elongated flat strap with a first end and a second end;
    a male connector attached to the first end of the rigid non-flexible elongated flat strap for removably engaging a floor mounted female connector of an automobile of a three point seat belt and shoulder strap restraint system; and
    a female connector attached to the second end of the rigid non-flexible elongated flat strap for removably engaging a male connector of the three point seat belt and shoulder strap restraint system;
    wherein the rigid non-flexible elongated flat strap will stand upright when removably attached to the floor mounted female connector and has a length of between two and sixteen inches; and
    wherein the rigid non-flexible elongated flat strap has a bend that locates the female connector of the seat belt extender sideways out away from the side of the seat by a distance of between one inch and four inches when removably attached to the floor mounted female connector.

2. The seat belt extender of claim 1 wherein the rigid non-flexible flat strap is made of a rigid plastic.

3. The seat belt extender of claim 1 wherein the rigid non-flexible flat strap is made of aluminum.

4. The seat belt extender of claim 1 wherein the rigid non-flexible flat strap is made of steel.

5. The seat belt extender of claim 1 wherein the bend in the rigid non-flexible elongated flat strap is a single bend.

6. The seat belt extender of claim 5 wherein the single bend is located at or near the mid point of the flat strap.

7. The seat belt extender of claim 1 wherein the bend in the rigid non-flexible elongated flat strap is a double bend wherein each bend is spaced evenly between the two ends of the elongated flat strip.

8. The seat belt extender of claim 1 wherein the bend is a curve.

9. The seat belt extender of claim 1 wherein the length of the rigid non-flexible elongated flat strap is between four and eight inches.

10. The seat belt extender of claim 9 wherein the length of the rigid non-flexible elongated flat strap is about eight inches.

11. The seat belt extender of claim 1 wherein the bend in the rigid non-flexible elongated flat strap locates the female connector of the seat belt extender sideways out away from the side of the seat by a distance of between one inch and three inches when removably attached to the floor mounted female connector.

12. The seat belt extender of claim 1 wherein the bend in the rigid non-flexible elongated flat strap locates the female connector of the seat belt extender sideways out away from the side of the seat by a distance of about two inches when removably attached to the floor mounted female connector.

* * * * *